United States Patent [19]

Bunyoz et al.

[11] Patent Number: 4,790,692
[45] Date of Patent: Dec. 13, 1988

[54] ARRANGEMENT FOR TRANSPORTING DISINTEGRATED PARTICULATE SOLIDS

[75] Inventors: Yorgi Bunyoz, Malmö; Ulrik Rasmussen, Naestved; Ib Larsen, Vissenbjerg, both of Denmark

[73] Assignee: Fläkt AB, Nacka, Sweden

[21] Appl. No.: 21,753

[22] Filed: Mar. 4, 1987

Related U.S. Application Data

[30] Foreign Application Priority Data

Dec. 4, 1984 [SE] Sweden .................................. 8406142

[51] Int. Cl.$^4$ ............................................. B65G 53/52
[52] U.S. Cl. .................................. 406/181; 406/109; 406/123; 406/141; 266/188; 266/267; 110/104 R
[58] Field of Search ................. 406/92, 93, 109, 123, 406/141–144, 146, 181, 30; 266/182, 188, 265, 267, 268; 110/101 R, 101 C, 101 CF, 104 R, 102

[56] References Cited

U.S. PATENT DOCUMENTS

| | | | |
|---|---|---|---|
| 3,204,942 | 9/1965 | Matthys et al. | 266/182 |
| 3,689,045 | 9/1972 | Coulter et al. | 266/182 X |
| 4,027,920 | 6/1977 | Wennerstrom | 406/181 |
| 4,191,500 | 3/1980 | Oberg et al. | 406/181 X |
| 4,482,275 | 11/1984 | Shinozaki et al. | 406/93 X |
| 4,536,104 | 8/1985 | Bongert | 406/181 X |

FOREIGN PATENT DOCUMENTS

| | | | |
|---|---|---|---|
| 2159182 | 6/1973 | France. | |
| 52321 | 5/1981 | Japan | 406/93 |
| 207219 | 12/1983 | Japan | 406/93 |

Primary Examiner—Sherman D. Basinger
Assistant Examiner—Paul E. Salmon
Attorney, Agent, or Firm—Burns, Doane, Swecker & Mathis

[57] ABSTRACT

The invention relates to an arrangement for transporting disintegrated solid particles, in which the particles are transported by a quantity of air placed under an over pressure. The weight ratio of the particle/aix mixture lies within a range at which particle transportation gives rise to migrating particle agglomerations. Transportation of the particles is terminated in a particle agglomeration equalizing arrangement, from where the particles are transported further in the form of a particle/air mixture which has been equalized in time. Particle transportation is effected by at least two stages. A first stage in which the weight ratio of the particle/air mixture is greater than 15, and a second stage in which the weight ratio of the particle/air concentration is greater than 5 and lower than the weight ratio of the particle/air mixture in the first stage. The arrangement is used for transporting powdered coal to a powdered-coal burner connected to a combustion furnace.

16 Claims, 1 Drawing Sheet

ARRANGEMENT FOR TRANSPORTING DISINTEGRATED PARTICULATE SOLIDS

This application is a continuation of application Ser. No. 802,016, filed Nov. 25, 1985, now abandoned.

TECHNICAL FIELD

The present invention relates to an arrangement for transporting disintegrated particulate solids, and in particular to an arrangement in which the particles are transported by air placed under overpressure, in a so-called "dense-phase"-relationship, by which is meant that the weight ratio of particles to air is greater than one (1).

More particular the present invention refers to a particle transporting means, intended for the transportation of disintegrated solid particles, and comprising a container having an inlet and a plurality of outlets, each of which is preferably connectable to a powder coal burner, and an intake adapted to supply air to the container, the particles in the container being transported through said outlets with the aid of a quantity of air placed under an overpressure. Solid particles being fed through the inlet in a particle concentration which varies with time.

BACKGROUND PRIOR ART

A number of mutually different arrangements are known to the art, by means of which particles can be transported with the aid of quantities of air placed under an overpressure.

Such transportation normally requires the use of large quantities of air per quantity of particles transported. Such air to particle weight ratios have been found to provide reliable particle transportation, with but small risk of stoppages occurring in the transport conduit system. It is also known that because the main bulk of the medium transported in such cases is air, large quantities of energy are required per weight quantity of particles in order to transport the particles effectively. The wear on the conduits and valves incorporated in such transportation systems is also extremely heavy, due to the high speeds at which the particles move and the high-velocity impact of particles striking against the conduit and valve walls.

When the particle quantity is increased, however, so that the weight ratio of particles to air in the transport conduit system is greater than one, the transported medium is said to be transported in a "dense-phase"-relationship. When the particles are present in higher weight percentages, the particles, or powder, stream through the conduit system in the manner of a liquid. Friction between the individual particles is reduced by air which flows therebetween. If the weight percentage of particles was to be increased still further, insufficient air would be present to allow the particles to move relative to one another. The particles would then be transported in the form of a "solid mass", which is pushed in front of the pressurized air applied.

Much less energy is required to transport particles in a dense-phase-relationship than in a relationship in which the weight quantity of particles per kilogram air is lower, and also results in less wear on the conduits, since particle speeds, in this case, are extremely low, for example 3–5 m/s.

It is well known in this art that an increase in the weight percentage of particles present results in a pulsating flow of material. This is particularly true in those cases where the particles are transported over longer distances, since in this case the particles collect to form "waves", which travel intermittently along the conduit, reaching the discharge end thereof in a discontinuous flow.

It is also known that an increase in the particle/air ratio will increase the risk of stoppages in the transport conduit system.

It is further known that when particles are transported in a dense-phase relationship it is necessary to place under pressure a container, a so-called dispatching vessel, which is filled either totally or partially with the particles to be transported. Consequently, the transportation of particles is normally discontinuous. When the container was been emptied of particles, the transportation of particles is interrupted and the conduit system blown clean, whereafter the dispatching vessel is again filled with particles and re-pressurized.

In order to overcome this discontinuity in particle flow, however, and to render the process continuous, it is known to provide two particle dispatching vessels which operate alternately, to dispatch particles to one and the same particle transport conduit, or to gate particulate material into a dispatching vessel constantly held under pressure.

All known particle transporting systems which operate with high particle/air mixtures, however, deliver the material intermittently, i.e. in time varying flow distribution.

Neither is the particle velocity and particle outflow controlled in hitherto known constructions. The magnitude of the required overpressure is contingent on the length of the transportation path, and consequently the conditions at the outlet end of the conduit system are also determined. The transport system delivers particulate material at a given maximum capacity, but without affording the possibility of regulating the flow and its distribution in time.

A method for transporting disintegrated solid particles in a "dense-phase"-relationship is described and illustrated in the U.S. Pat. No. 4,191,500, this method comprising the steps of (a) filling a supply container with disintegrated particles;

(b) sealing the container;

(c) supplying a vehicle gas to the sealed container through an inlet which is placed under pressure to an extent such as to create a momentary pressure level which exceeds the level of pressure in a downstream located supply conduit;

(d) opening a valve, which connects a lower part of the container to said downstream supply line, such as to effect particle feed in response to the pressure difference thus created and to the expansion of gas in the particle interstices; and (e) supplying further gas through said pressurized inlet, through said container to an extent sufficient to both maintain the pressure difference between the container and supply conduit and to cause the particles to move from the container through said valve and supply conduit to an outlet.

To the prior art relevant to this technical field belongs the France patent specification No. 2,159,182 in which is described a construction where solid particles passing into a container in varying concentrations and where said particles are leaving said container in a lower end having a less varying particle concentration.

DISCLOSURE OF THE INVENTION

TECHNICAL PROBLEM

One technical problem in this field is that of providing a particle transporting arrangement or system in which the particles can be transported by means of a quantity of air placed under overpressure, and in which such transprotation can be effected with an even flow distribution, despite the high weight relationship between particles and air.

Thus, a technical problem resides in the ability to construct a particle transporting arrangement in which the effect of the migration of particle agglomerations normal in particle transport arrangements operating at high particle/air weight ratios is eliminated.

Another technical problem in this regard is one of providing an arrangement for the transportation of disintegrated or crushed solid particles in which the particles can be transported at low energy inputs, meaning in practice that the percentage of particles present is very large in relation to the percentage of air present.

Another technical problem with respect to particle transporting arrangements of the aforesaid kind is one of enabling the particles to be transported in a plurality of stages, where the relationship between particle weight and air weight decreases for each stage in the transport direction, for example in a controllable manner.

With respect to the prior art in this particular field, as described in the aforegoing, it is obvious that one prominent technical problem resides in providing a particle transporting arrangement capable of continuously transporting particle-air mixtures in which the weight ratio of particles/air is greater than five.

A still more difficultly resolved technical problem is, of course, one of providing a particle transporting arrangement in which the weight related ratio of particles/air can exceed twenty, or even preferably between thirty and forty.

In the case of powdered-coal transporting arrangements arranged for supplying powdered coal to a powdered-coal burner connected to a combustion furnace, one prominent technical problem resides in the provision of such an arrangement capable of feeding to a powdered coal burner a powdered-coal/air mixture having a weight ratio greater than five.

A further prominent technical problem is one of providing a powdered-coal transporting arrangement in which the powdered coal is transported through a conduit by means of a quantity of air under pressure, where the actual transportation of the powdered coal can be effected with a uniform flow distribution, thus eliminating the occurrence of migration particle agglomerations common in known powdered-coal transporting arrangements.

One qualified technical problem in powdered-coal transporting arrangements of the aforesaid kind is one of providing a powdered-coal transporting arrangement which operates with but low losses, and which enables large quantities of powdered coal to be transported for each quantity of air without resulting in the troublesome occurrence of migrating particle agglomerations.

It will be seen that a further technical problem is one of providing a powdered-coal transporting arrangement capable of transporting continuously large quantities of powdered coal for each quantity of air, without resulting in stoppages in transport conduit systems as a result of the build-up of powdered coal agglomerates, and with which the material is still transported in accordance with the principles of a fluidized bed.

In the case of powdered-coal transporting arrangements which are intended to transport powdered coal over long distances, one technical problem resides in providing conditions which enable the percentage of powdered coal present to be increased as required, up to a level in the proximity of the limit for possible transportation through a longer first transporting path, and to enable the said powdered-coal percentage to be made smaller for transporting the coal through a shorter, second transport path, a so-called terminal transport path.

With respect to the percentage of aid present, a further technical problem in this art, and particularly with regard to powdered-coal transporting arrangements, is one of providing means which enable the percentage of powdered coal present to be regulated, such that said powdered-coal percentage can be connected directly to a powdered-coal burner and the power output of the burner controlled by regulating the percentage of powdered coal supplied thereto.

SOLUTION

The present invention relates to an arrangement for transporting disintegrated or crushed solid particles, in which the particles are transported by means of quantities of air placed under overpressure.

It is proposed in accordance with the present invention that an inlet has the form of a tangentially extending pipe, arranged in the one end region of the container, and opening out at a location adjacent the wall of said container; in that the outlets comprise a plurality of axially directed pipes, having open ends located in the end region of the container opposite to the first mentioned end region; in that the container has a curved inner surface which surrounds the pipes serving as said outlets; in that the solid particles passing in in varying concentrations through the inlet are arranged to pass along the curved inner surface of the container along a path adopting itself more or less to a helix; in that said passage along the curved interior of the container has an equalizing effect on the particle concentrations varying in time; and in that through each of said outlets there passes a stream of particles which presents a lower and less varying particle concentration in time in relation to the stream of particles passing through said inlet.

It is further proposed in accordance with the present invention that in an arrangement of this kind the weight ratio of the particle-air mixture is chosen within a range in which the transportation of particles gives rise to migration particle agglomerations, and in which said transportation is terminated in means arranged to smooth out the particle agglomerations, from whence the particles are transported in a particle-air mixture equalized in time.

The particles are preferably transported in at least two stages, these comprising a first stage in which the weight ratio of particles/air in the mixture exceeds fifteen, and a second stage in which the weight ratio of particles/air in said mixture exceeds five, the weight ratio of particles/air in the mixture thus being lower in the second stage than in the first stage.

The weight ratio of particles/air in the first stage preferably exceeds twenty, and practical tests have shown that a ratio of between thirty and forty is particularly advantageous.

The transition from the first to the second stage is located in the downstream end of a particle feed conduit incorporated in the particle transporting arrangement. The transition from the first to the second stage is conveniently effected with the aid of an air supply and in a container in which no storage of material takes place.

The invention relates more particularly to a particle transporting arrangement intended for transporting powdered coal to a powdered-coal burner connected to a combustion furnace, in which arrangement the powdered coal can be transported through a conduit by means of a quantity of air placed under overpressure.

It is proposed in accordance with the invention that the powdered coal is transported by said arrangement in at least two stages, a first stage in which the weight ratio of powdered-coal/air in mixture exceeds fifteen, and a second stage in which there is obtained a powdered-coal/air mixture suitable for direct feed to a powdered-coal burner.

The weight ratio of powdered-coal/air in the mixture in the first stage suitably exceeds twenty, and is preferably between thirty and forty.

According to one advantageous embodiment, the transition from the first to the second stage is located in the immediate vicinity of the powdered-coal burner, up to 20 m, preferably 4–10 meters therefrom.

The passage of the mixture from the first stage to the second stage is effected by supplying air at the junction between said stages, therewith lowering the weight ratio of powdered-coal/air in the mixture to a value above five, such as to render the mixture suitable for direct charging to one or more powdered-coal burners. The mixture is conveniently adjusted in the second stage to a weight ratio of particles/air of between eight and twenty, preferably between ten and fifteen.

In accordance with another embodiment of the invention transfer of the powdered-coal/air mixture from the first to the second stage is effected by passing the mixture in the first stage to a container through a conduit or a plurality of conduits arranged to extend substantially tangentially in the upper region of the container, one such conduit being provided for each powdered-coal burner, and arranged to extend through the container with the outfeed orifices of the conduits located adjacent one another in the bottom region of the container. Means are provided for supplying a stream of air to the container from the lower region thereof.

In accordance with another embodiment of the invention a container of circular cross-section is arranged between the first and the second stage. This substantially cylindrical container arranged between the first and the second stages preferably has a height which exceeds its diameter and exhibits a slightly constricted lower part. In addition, the conduit ends shall be arranged centrally adjacent the lower part of the container and gathered within an area smaller than half the diameter of the container.

ADVANTAGES

Those advantages primarily afforded by an arrangement for transporting disintegrated, finely divided solid particles in accordance with the present invention, or a powdered-coal transporting arrangement in accordance with the invention, reside in the ability of transporting fine particulate materials in accordance with the principles of a fluidized bed at low energy inputs, this arrangement being capable of transporting particles (for example powdered coal to a burner) with but small particle-feed variations in time. With respect to a powdered-coal transporting arrangement possibilities are provided of enabling powdered coal to be supplied to a powdered-coal burner continuously and in constant flow, while enabling the percentage of powdered coal in the powdered-coal/air mixture to be readily regulated per unit of time.

The primary characteristic feature of an arrangement for transporting disintegrated solid particles in accordance with the present invention are set forth in the characterizing clause of claim 1, while an arrangement suitable for transporting powdered coal to a powdered-coal burner connected to a combustion furnace in accordance with the present invention are set forth in the characterizing clause of the following claim 7.

BRIEF DESCRIPTION OF THE DRAWINGS

A preferred embodiment exhibiting characteristic features significant of the present invention will now be described in more detail with reference to the accompanying drawing, in which.

DESCRIPTION OF A PREFERRED EMBODIMENT

Figure 1:
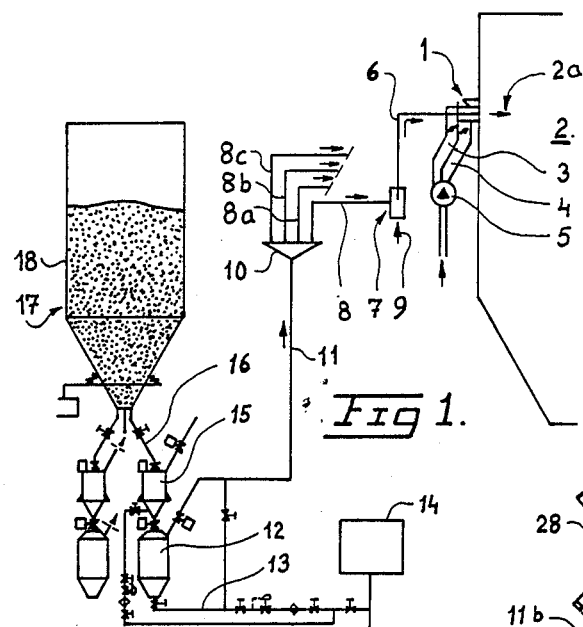
FIG. 1 is a greatly simplified view of a plant for the continuous operation of a plurality of powdered-coal burners and of powdered-coal transporting arrangements connected thereto, and illustrates a powdered-coal magazine.

FIG. 1 is a greatly simplified view of a system for continuously supplying powdered coal to a powdered-coal burner 1 which forms one of a number of such burners and which is connected to a combustion furnace 2 provided with a fire hearth 2a. Primary air is supplied to the fire hearth through a connection 3 adjacent the powdered-coal burner 1, and secondary air is supplied to the fire hearth through a connection 4, this supply being effected with the aid of one and the same fan means 5. The ratio between the volumes or weights of primary air 3 and secondary air 4 is substantially one to three.

The powdered-coal transporting arrangement includes a conduit 6 through which powdered coal is fed continuously to the burner 1. The conduit 6 co-operates with a unit 7, referred to hereinafter as a transformer, which is effective to transform or change the ratio of powdered-coal to air. Powdered-coal/air mixture of high weight ratio transported through respective conduit 8, is transformed in the transformer 7 to a somewhat lower powdered-coal/air weight ratio. Air is supplied in the transformer 7 to the incoming suspension through a conduit 9, and a powdered-coal/air mixture of lower weight ratio is taken out and transported in the conduit 6. The particles do not remain in the transformer 7 so as to be stored or layered therein.

The arrangement illustrated in FIG. 1 also incorporates a distributor 10 which is arranged to distribute powdered-coal/air mixture transported through a conduit 11 to one or more of four powdered-coal burners 1. The conduit 8 of the illustrated embodiment is connected to the transformer 7. Remaining conduits 8a, 8b and 8c are connected to similar transformers (not shown) which serve other powdered-coal burners (not shown).

The conduit 11 is connected to a unit or vessel 12 to which pressurized air is fed from a compressor station 14 through a conduit 13. When the unit, or vessel 12 contains powdered coal, said coal can be transported through the conduit 11 by the pressurzied air passing through the conduit 13. Located above the vessel 12 is a filling unit 15 which is connected through a conduit 16 with a silo 17 filled with powdered coal 18.

It is previously known per se to transport powdered coal with the aid of an arrangement of the principal design illustrated in FIG. 1. It will be noted, however, that in accordance with the invention the weight ratio of the powdered-coal/air mixture in the conduit 11 shall be greater than thirty, or greater even than forty.

Air is supplied to the transformer 7 through the conduit 9, such that the powdered-coal/air mixture passing through the conduit 6 to a respective burner 1 will have a weight ratio greater than five, preferably between eight and twenty, and suitably between ten and fifteen.

Figure 2:
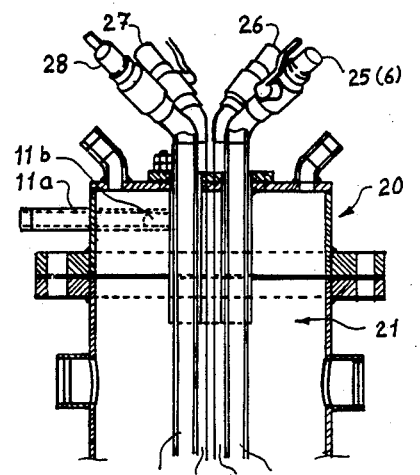
FIG. 2 is a side view in section of a unit incorporated in the powdered-coal transporting arrangement for distributing powdered coal and changing the powdered-coal concentration in the mixture, said unit being usable in a system according to FIG. 1.

FIG. 2 illustrates a combined fuel-mixture distributor 10 and transformer 7 in side view, and partially in section, this assembly being incorporated in a powdered-coal transporting arrangement.

Thus, it can be assumed that the unit or assembly illustrated in FIG. 2 is incorporated in an arrangement for continuously transporting powdered coal to a powdered-coal burner connected to a combustion chamber, in which the powdered coal is transported with the aid of a quantity of air placed under overpressure. The powdered coal is transported to the burner in at least two stages, a first stage in which the weight ratio of the powdered-coal/air mixture exceeds fifteen, and a second stage in which there is obtained a powdered-coal/air mixture suitable for direct continuous supply to the powdered-coal burner.

The weight ratio of the powdered-coal/air mixture in the first stage may exceed twenty, and is preferably between thirty and forty.

The junction from the first to the second stage is arranged in the immediate proximity of the powdered-coal burner 1.

The powdered-coal/air mixture is transferred from the first to the second stage while supplying air to the mixture, therewith to lower the weight ratio of the powdered-coal/air mixture to a value greater than five. This mixture shall be supplied continuously to a plurality of powdered-coal burners. The weight ratio is suitably between eight and twenty, preferably between ten and fifteen.

The powdered-coal/air mixture for the first stage is supplied to a container through a conduit which extends substantially tangentially in the upper region of the container; and a plurality of conduits, one for each powdered-coal burner, extend through the container with the discharge orifices of respective conduits arranged adjacent one another in the lower region of the container.

A stream of air is arranged to be supplied to the container at its lowermost region.

The transformer, here referenced 20, is provided with a connector 11a for the conduit 11, the powdered-coal/air mixture being fed through the connector into a substantially cylindrical space 21. Arranged in the bottom part 21a of the space 21 is a screen 22 and a connector 23 through which air under overpressure is supplied to a further space 21b.

Powdered-coal mixture accomodated in the space 21 is now thinned with air supplied through the connector 23, this thinned powdered-coal mixture passing out through conduits 25, 26, 27 and 28 (the conduit 25 is assumed to be identical to the conduit 6) leading to a respective powdered-coal burner.

It is a known fact that when a powdered-coal/air mixture having the aforesaid weight ratio is supplied through the conduit 11, the said mixture will be transported at uneven particle concentrations. Such uneven particle concentration is eliminated with the arrangement according to the present invention, due to the fact that the outlet orifice 11b of the conduit 11 extends tangentially in the space 21 and consequently imparts a swirling or vortex-like motion to the powdered coal located around the conduits 25, 26, 27 and 28.

Figure 3:
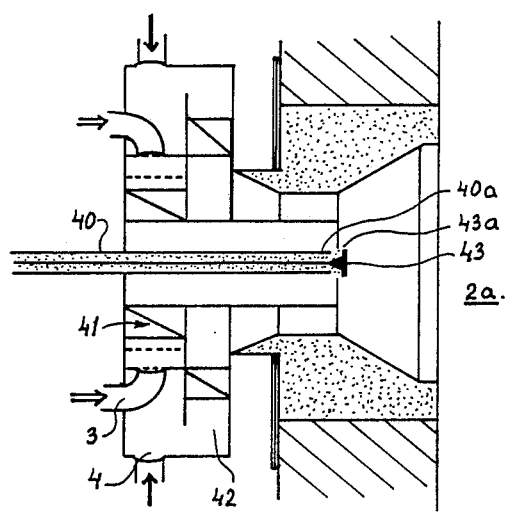
FIG. 3 is a sectional view of a powdered-coal burner according to the invention.
Figure 3:
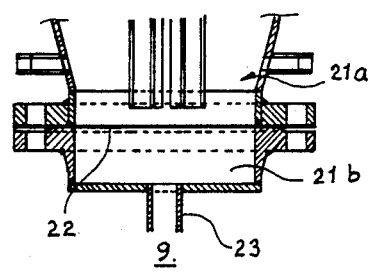

A powdered-coal burner according to the present invention is illustrated in side view and in section in FIG. 3. The illustrated burner incorporates a first tubular element 40 through which powdered coal intended for combustion is transported continuously with the aid of pressurized air, in the aforesaid manner. The burner also includes first means (3) 41, for supplying primary air to the first hearth 2a, and second means (4) 42, for supplying secondary air to said hearth 2a for the purpose of improving combustion of an established flame.

The weight of powdered coal per unit of time and the weight of air per unit of time in the powdered-coal/air mixture conveyed in the element 40 are mutually chosen in a common mixture for supply to the fire hearth 2a via the first tubular element 40, such as to present a weight ratio greater than five. Preferably, the weight ratio of the powdered-coal/air mixture is between eight and twenty, and practical tests indicate that ratios between ten and fifteen are beneficial.

It should be noted that the tubular first element 40 is dimensioned and adapted for insertion into a defined space intended for an oil spray-nozzle or injector and oil-supply line of an oil-fired plant and left vacant when they are removed from said oil-fired plant. In other respects, the oil-fired plant may be capable of being used intact, through the agency of first means for supplying primary air and the use of second means for supplying secondary air to the fire hearth 2a.

The exit orifice 40a of the first tubular element 40 is arranged to co-operate with a conical, elongated distributing or dispensing device 43, a so-called "bluff body", positioned in the centre of a rotating vortex formed by said primary and secondary air flows.

The first means for supplying primary air to the fire hearth, and the second means for supplying secondary air thereto are mutually selected to effect an air-supply ratio of one to three.

Rotation of the vortex formed behind the distribution or dispenser in the fire hearth by the primary and/or secondary air is effected with the aid of variable, inclined vanes located in cylindrical channels.

The tubular first element 40 has an inner diameter of between ten and twenty five mm, preferably about fifteen mm.

The apex of the conical distributing or dispensing device 43 is centered in the first element, and the cone angle is from 50° to 110°, preferably from 60° to 90°.

The cone-shaped part 43 has an outer edge 43a which is spaced from the exit orifice 40a of the first element at a distance of from eight to twenty mm, preferably about ten mm. This distance may be slightly less than the distance between the diametrically located wall parts of the element 40.

The cone-shaped part presents a further edge 43, which extends to a distance of from one to ten mm beyond a geometric extension of the inner diameter of the element.

Referring to FIG. 2, it will be seen that the container arranged between the first and the second stages has a circular cross-section. The height of the substantially cylindrical container arranged between the first and second stages is greater than its diameter, and the container presents a slightly constricted lower part. In addition, the ends of the conduit shall be arranged centrally adjacent the lower part of the container and are gathered within an area smaller than half the container diameter.

By way of explanation it can be mentioned that in FIG. 1 there is illustrated an arrangement which first distributes the powder in conduit 11 to various burners, and that located in respective conduits leading to respective burners is a transformer 7 which thins the powder/air mixture with additional air. The arrangement illustrated in FIG. 2 is constructed on the principle that the mixture is first transformed to thinner consistency and then distributed.

The pulsatile inflow of powderous material to conduit 11 is thinned in the container 20 and distributed so that a homogenous flow of material, or a material flow which only exhibits negligible variations in particle density, leaves the container through the conduit 8—8c.

The arrangement is such that within a given period of time all ingoing quantities of powderous material, irrespective of variations, is fed from the container in the form of a uniform stream of powderous material at a speed of fifteen to thirty m/sec preferably twenty to twenty five m/sec, and in a particle/air mixture having a weight ratio of particle/air of between ten and fifteen.

The container has a height shorter than a measurement corresponding to one meter.

The cone-shaped part 43 is centered in relation to the tubular first element 40 and is preferably regulateable along said element to enable the gap presented to the powdered-coal/air mixture passing through the tubular element to be regulated, and therewith also the form of the flame.

The invention is not restricted to the aforedescribed exemplifying embodiments, and modifications can be made within the scope of the following claims.

We claim:

1. A pulverized or powdered coal burning arrangement having:
    (a) at least one powdered-coal burner connected to a combustion furnace provided with a fire hearth, where primary air is supplied to said fire hearth through a first connection, having an open end arranged adjacent the powdered-coal burner, and secondary air is supplied to said fire hearth through a second connection,
    (b) a powdered-coal transporting arrangement, including a first conduit, through which powdered coal is fed from a unit continuously to said at least one powdered-coal burner,
    (c) a second conduit for transporting to said unit from a vessel, by pressurized air, said mixture of powdered coal and air having a powdered-coal to air weight ratio higher than the powdered-coal to air weight ratio in said first conduit connected to said at least one powdered-coal burner wherein said unit is effective to transform incoming powdered-coal to air weight ratio into a lower powdered-coal to air weight ratio by supplying to said unit pressurized air through a third conduit so that prepared powdered coal stored in a silo, can be transported to said burner through at least two transporting stages, a first stage where the powdered-coal to air weight ratio in said second conduit shall be greater than twenty and a second stage where the powdered-coal to air weight ratio in said first conduit shall be greater than five, a junction between the first and the second stages arranged in the proximity of the powdered-coal burner and said pressurized air supplied through said third conduit is also used in said burner, and
    (d) the powdered-coal/air mixture for the first stage being supplied to the unit through a conduit extending substantially tangentially in an upper region of the unit; and a plurality of conduits, one for said at least one powdered-coal burner extending vertically through the container with exit orifices of said plurality of conduits located adjacent one another in a lower region of the unit.

2. An arrangement according to claim 1, wherein said unit comprises a container having an inlet and a plurality of outlets, each of which is connectable to a powdered coal burner, and an intake for supplying pressurized air to the container, the coal particles in the container being transported through said outlets by a quantity of air supplied by an overpressure, the powdered coal particles being fed through said second conduit and said inlet having a particle concentrations which varies with time, said particle concentrations being arranged to pass along the interior of the container to cause an equalizing effect on the particle concentrations, so that through each of said outlets a stream of coal particles is passed, which presents a lower and less varying coal particle concentration in time in relation to said stream of particles passing through the inlet to said burner.

3. An arrangement according to claim 2, wherein said second stage has the weight ratio of the particle/air mixture exceeding five but is lower than the weight ratio of the particle/air mixture in the first stage.

4. An arrangement according to claim 1, wherein the weight ratio of the particle/air mixture in the first stage is greater than twenty and preferably between thirty and forty.

5. An arrangement according to claim 1, wherein said second stage has the weight ratio of the particle/air mixture exceeding five but is lower than the weight ratio of the particle/air mixture in the first stage.

6. An arrangement according to claim 5, wherein the weight ratio of the particle/air mixture in the first stage is greater than twenty and preferably between thirty and forty.

7. An arrangement according to claim 1, wherein the weight ratio of the particle/air mixture in the first stage is greater than twenty and preferably between thirty and forty.

8. An arrangement according to claim 1, wherein the transition from the first to the second stage is located in a downstream end of a particle-transporting conduit incorporated in the particle transporting arrangement.

9. An arrangement according to claim 1, wherein the transition from the first to the second stage is located in proximity to the powdered-coal burner.

10. An arrangement according to claim 1, wherein the weight ratio of the second stage is between eight and twenty and preferably between ten and fifteen.

11. An arrangement according to claim 1, wherein an air stream extends from a lowermost region of the unit.

12. An arrangement according to claim 1, wherein the unit is of circular cross-section and is arranged between the first and the second stage.

13. An arrangement according to claim 1, wherein arranged between the first and the second stage is the unit comprising substantially a cylindrical container having a height greater than its diameter.

14. An arrangement according to claim 1, wherein arranged between the first and the second stage is the unit comprising substantially cylindrical unit having a constricted lower part.

15. An arrangement according to claim 1, wherein exit orifices of the second conduit are arranged centrally adjacent a lower part of the unit and gathered within an area having a diameter less than half of a diameter of the unit.

16. An arrangement according to claim 1, wherein a transition distance from the first stage to the second stage is less than twenty meters and preferably four to ten meters.

* * * * *